United States Patent
Luotojärvi et al.

(10) Patent No.: US 9,740,727 B2
(45) Date of Patent: Aug. 22, 2017

(54) METHOD AND A SYSTEM FOR REPLICATING DATABASES

(75) Inventors: Mika Luotojärvi, Espoo (FI); Riku Hyttinen, Kerava (FI); Tomi Vihtari, Järvenpää (FI)

(73) Assignee: ABB Schweiz AG, Baden (CH)

( * ) Notice: Subject to any disclaimer, the term of this patent is extended or adjusted under 35 U.S.C. 154(b) by 460 days.

(21) Appl. No.: 12/249,378

(22) Filed: Oct. 10, 2008

(65) Prior Publication Data
US 2010/0094802 A1    Apr. 15, 2010

(51) Int. Cl.
   *G06F 17/30*    (2006.01)
(52) U.S. Cl.
   CPC .. *G06F 17/30371* (2013.01); *G06F 17/30327* (2013.01); *G06F 17/30575* (2013.01); *G06F 17/30961* (2013.01)
(58) Field of Classification Search
   CPC ......... G06F 17/30371; G06F 17/30327; G06F 17/30575; G06F 17/30961
   USPC ....................................................... 707/204
   See application file for complete search history.

(56) References Cited

U.S. PATENT DOCUMENTS

| | | | |
|---|---|---|---|
| 5,872,770 A | 2/1999 | Park et al. | |
| 6,529,917 B1 | 3/2003 | Zoltan | |
| 6,748,381 B1 | 6/2004 | Chao et al. | |
| 2003/0158852 A1 | 8/2003 | Zoltan | |
| 2003/0158868 A1 | 8/2003 | Zoltan | |
| 2004/0155960 A1* | 8/2004 | Wren et al. | 348/150 |
| 2006/0195759 A1* | 8/2006 | Bower | 714/758 |
| 2007/0242682 A1 | 10/2007 | Kyusojin et al. | |

FOREIGN PATENT DOCUMENTS

| | | |
|---|---|---|
| WO | WO94/06080 | 3/1994 |
| WO | WO 94/06080 A1 | 3/1994 |

OTHER PUBLICATIONS

Coelho, "Remote Comparison of Database Tables Technical Report A/375/CRI" Technical Report A/375/CRI Centre De Recherche En Informatique, Feb. 6, 2006, pp. 1-12, XP002557302.

(Continued)

*Primary Examiner* — Evan Aspinwall
(74) *Attorney, Agent, or Firm* — Taft Stettinius & Hollister LLP

(57) ABSTRACT

A method for replicating databases, in which method at least two databases are replicated, each database comprising of one or more tables, and each table having data and a unique tree index comprising index keys and hierarchical sums of cyclic redundancy check values calculated from the data on each tree index level. In the method logical consistency of the data between corresponding tables in the databases is maintained by comparing the sums of cyclic redundancy check values of the database tables; and if a difference between the sums of the cyclic redundancy check values is found, the tree indexes are logically divided into two sub tree indexes, and the sums of the cyclic redundancy check values of the sub tree indexes are compared to each other and the comparison and division is continued until the data causing the difference is found, and the inconsistent data is replicated between the databases.

14 Claims, 3 Drawing Sheets

(56) References Cited

OTHER PUBLICATIONS

Demers et al., "Epidemic Algorithms for Replicated Database Maintenance" Operating Systems Review, ACM, New York, NY, US, Jan. 1, 1988, vol. 22, No. 1, pp. 8-32, XP000003914.
European Search Report dated Dec. 8, 2009, issued in the corresponding European Application No. 09172168.8-2201.
Print out of Database Search Results, pp. 1-13.
English-language translation of CN Office Action dated Sep. 26, 2011 in a corresponding Patent Application No. 200910206036.4, 8 pages.
Metzner, John J., "A parity Structure for Large Remotely Located Replicated Data Files", IEEE Transactions on Computers, vol. C-32, No. 1, Aug. 1983, pp. 727-730.
Jain et al., "TAPER: Tiered Approach for Eliminating Redundancy in Replica Synchronization" 4th Usenix Conference on File and Storage Technologies Usenix Association San Francisco, CA, USA, Dec. 13, 2005, pp. 281-294, XP002557303.

\* cited by examiner

METHOD AND A SYSTEM FOR REPLICATING DATABASES

SCOPE OF THE INVENTION

The present invention relates to a method, a computer readable medium and a system for replicating databases according to the preambles of claims 1, 4, 8 and 9.

PRIOR ART

Data is often stored in databases in computer systems. When a database is replicated the same data is stored on multiple storage devices. The replication is performed frequently and it gives multiple consistent copies of the same database.

An information management system collects and manages information from several sources and distributes it to defined systems. Information may be collected from all fields of technology, business or health care, for instance.

High reliability and uninterrupted operation of the process information management system (PIMS) is needed in mission critical systems such as advanced process control of an oil refinery or the operations monitoring of a nuclear power plant. Any single point of failure in the computer systems must not interrupt the real-time operation of the process information management system or the applications running on it.

Traditionally there has been used PC clustering technology to build redundant process information management systems. Then the system and the database are running in one node at the time and in case of hardware or software failure the system is started up in the standby node. A failure always causes an undesirable break in the system operation.

Relational database systems are providing several concepts of building high availability solutions and database replication functionality, but the performance of them does not meet the requirements usually set to process information management systems.

Some process historian products are able to provide redundancy for process history, but they are not capable to store relational data.

DESCRIPTION OF INVENTION

The purpose of the present invention is to create a method, a computer program product and a system for replicating databases. In order to achieve this, the invention is characterized by the features specified in the characteristics sections of claims 1, 4, 8 and 9. Some other preferred embodiments of the invention have the characteristics specified in the dependent claims.

A method for replicating databases, in which method at least two databases are replicated, each database comprising of one or more tables, and each table having data and a unique tree index comprising index keys and hierarchical sums of cyclic redundancy check values calculated from the data on each tree index level. In the method logical consistency of the data between corresponding tables in the databases is maintained by comparing the sums of cyclic redundancy check values of the database tables; and if a difference between the sums of the cyclic redundancy check values is found, the tree indexes are logically divided into two sub tree indexes, and the sums of the cyclic redundancy check values of the sub tree indexes are compared to each other. The comparison and division is continued until the data causing the difference is found, and the inconsistent data is replicated between the databases.

A method for replicating databases in an information management system for ensuring consistency of the databases. In the method at least two databases are replicated, each database comprising of one or more tables, each table having real time data and a unique tree index comprising index keys and hierarchical sums of cyclic redundancy check values calculated from the data on each tree index level. Logical consistency of the data between corresponding tables in the databases is maintained by comparing the sums of cyclic redundancy check values of the database tables; and if a difference between the sums of the cyclic redundancy check values is found, the tree indexes are logically divided into two sub tree indexes, and the sums of the cyclic redundancy check values of the sub tree indexes are compared to each other and the comparison and division is continued until the data causing the difference is found. The inconsistent data is replicated between the databases, and the replicated databases are put to serve the information management system.

A computer-readable medium configured with instructions that when executed by one or more processors cause carrying out a method for replicating databases, in which method at least two databases are replicated, each database comprising of one or more tables, and each table having data and a unique tree index comprising index keys and hierarchical sums of cyclic redundancy check values calculated from the data on each tree index level, in which method logical consistency of the data between corresponding tables in the databases is maintained by comparing the sums of cyclic redundancy check values of the database tables; and if a difference between the sums of the cyclic redundancy check values is found, the tree indexes are logically divided into two sub tree indexes, and the sums of the cyclic redundancy check values of the sub tree indexes are compared to each other and the comparison and division is continued until the data causing the difference is found, and the inconsistent data is replicated between the databases.

A system for replicating databases comprising: at least two databases comprising of tables having one or more tables, and each table having data and a unique tree index comprising index keys and hierarchical sums of cyclic redundancy check values calculated from the data on each tree index level, and means for maintaining logical consistency of the data between corresponding tables in the databases by comparing the sums of cyclic redundancy check values of the database tables; and means for finding a difference between the sums of the cyclic redundancy check values, means for logically dividing the tree indexes into two sub tree indexes, and means for comparing the sums of the cyclic redundancy check values of the sub tree indexes to each other and means for continuing the comparison and division until the data causing the difference is found, and means for replicating the inconsistent data is between the databases.

In the method for replicating databases an index is an ordered set of references, for example pointers, to the records or data rows in a database file or table. An index is based on one or more columns of the table. An index structure in the database is a B-tree or a B+ tree, for example. A B-tree is a data structure that maintains an ordered set of data and allows efficient operations to find, delete, insert, and browse the data.

The method and system for replicating databases is used to ensure the consistency of databases for instance in a process information management system. When one of the servers providing database services in the process information management system is down for instance due to hardware failure or a disk system upgrade, the other server or servers are running. The data supplied to the process information management system is stored to the databases of the running server or servers. The data is coming from the control and monitoring systems from a plant and comprises measured operating values or parameters from devices and calculated control values for the process devices. After the recovery of the server it is missing the data supplied to other servers during the down time. Then consistency of the databases in the servers is controlled by the method and system for replicating databases, i.e. the missing or changed data is transferred to the server which has been down and also the consistency of the servers which have been running is checked. When the replication of the databases is ready, the databases have the same stored information content and any of the databases can be in operation in the process information management system.

The method for replicating databases enables uninterrupted operation in case of any single point of failure in the computer systems and uninterrupted operation when rebuilding the system back to original one after the failure.

Other advantages are the high availability and better data access performance in case of load sharing. The high availability database provides the load sharing possibility between the redundant computers which can not be made with PC cluster technology.

The system for replicating databases does not need a transaction archive or similar that some of the relational databases are using in replication. Transaction archive is consuming storage space and decreasing performance. The copying and checking of information is a separate on-demand process.

The method for replicating databases gives the databases high availability and provides possibility to run two or more instances of the database system concurrently without any break in system operation in case of single computer failure. The system for replicating databases provides the option to build the system that contain several replicated databases in one system to provide higher level availability. The load sharing functionality provides possibility to scale the database system up to solutions which contain heavy calculations and/or very high number of concurrent users.

The system for replicating databases can be realized with low cost hardware. It enables building of the highly reliable real time process information management systems with inexpensive PC computers.

In the system for replicating databases the hardware can be decentralized, e.g. databases can be stored in different computers, without any special hardware. The decentralization is secure from a physical point of view, e.g. against fire risk.

FIGURES

In the following the invention will be described in more detail with the help of certain embodiments by referring to the enclosed drawings, where FIG. 1 is a general illustration of a system for a database replication;

DETAILED DESCRIPTION

Figure 1:
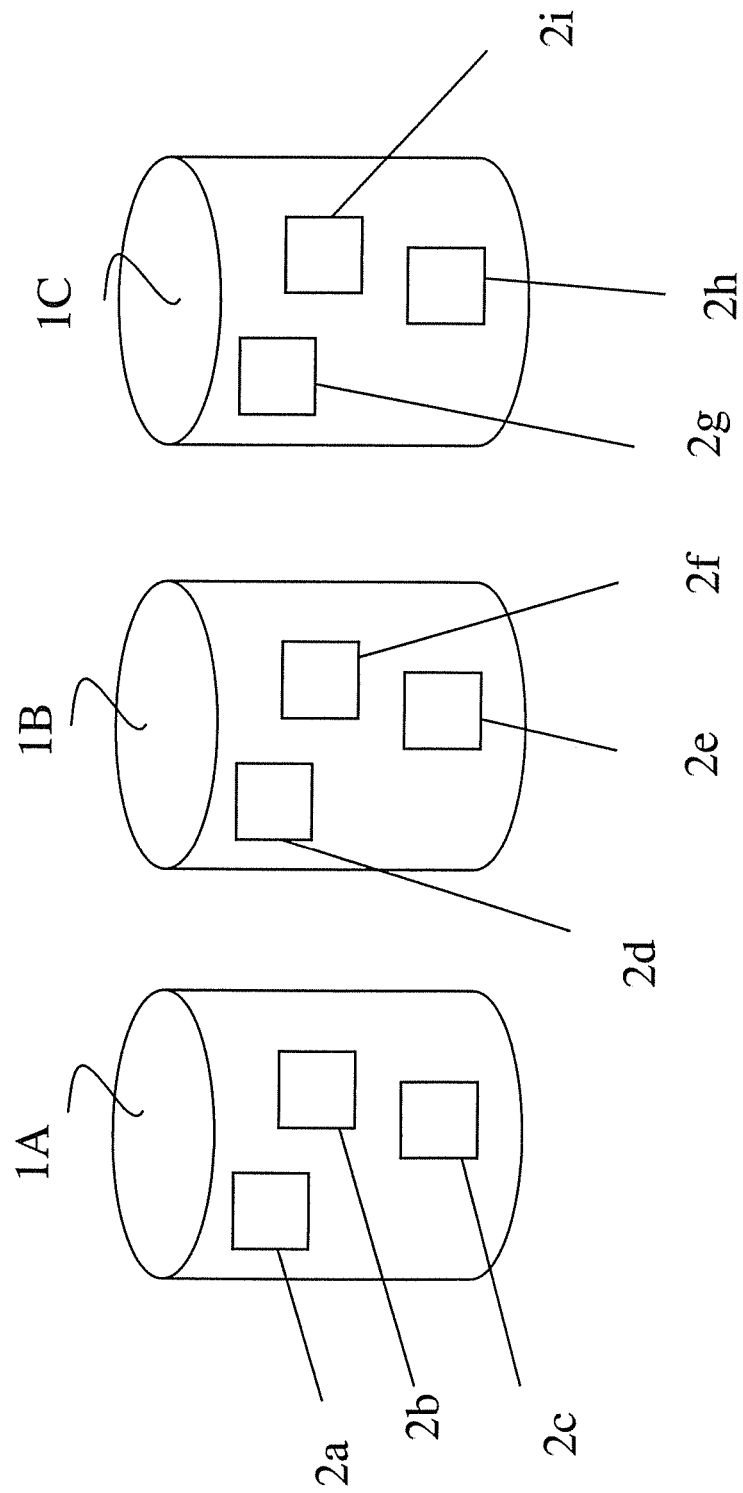

FIG. 1 illustrates a database replication system.

In the method for replicating databases two or more databases are replicated with each other. In FIG. 1 there are three databases 1A-1C. In the present embodiment the databases 1A-1C are relational databases confirming to relational model.

Figure 2:
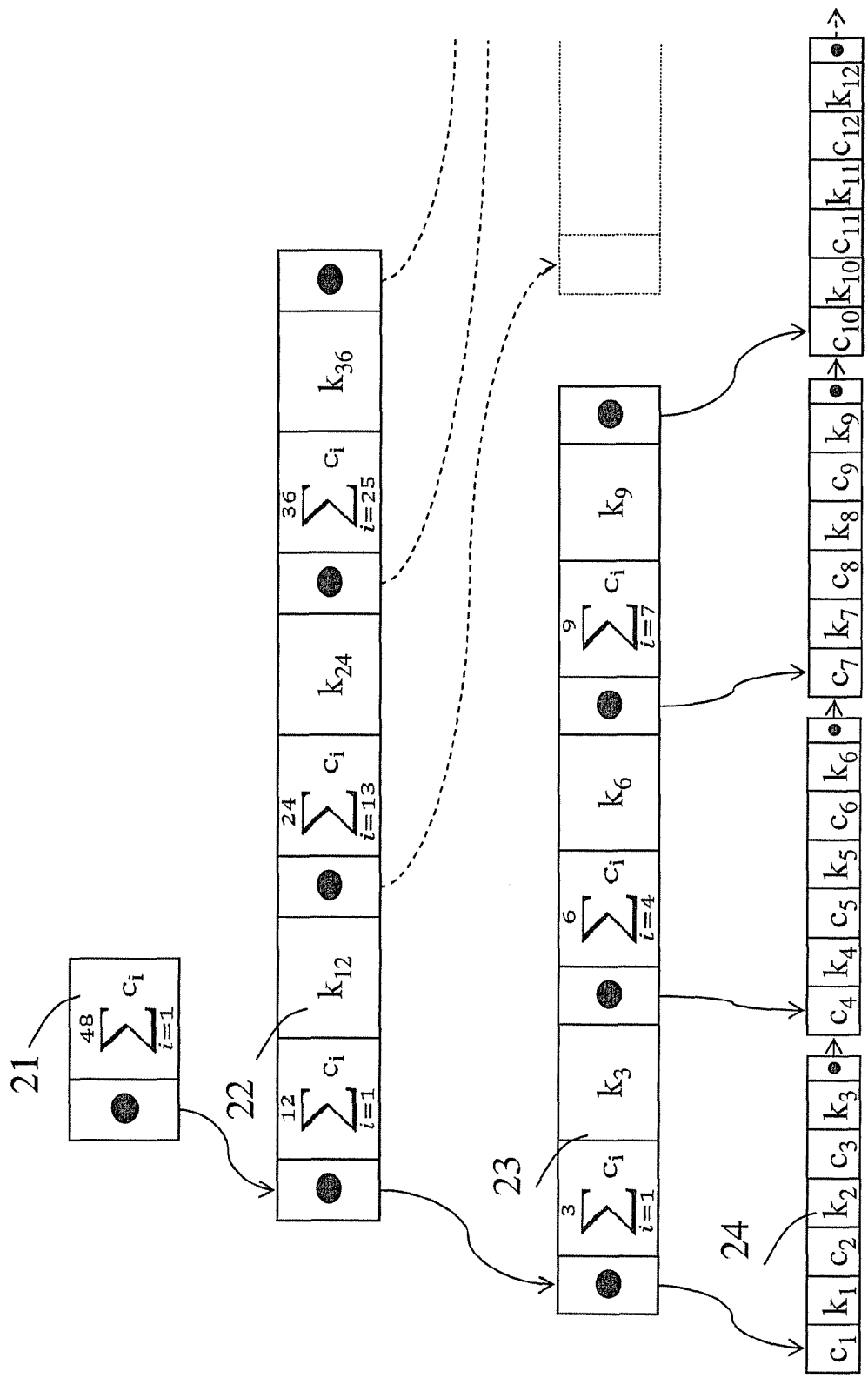
FIG. 2 is a general illustration of hierarchical cyclic redundancy check values stored in a B+Tree.

Each database 1A-1C comprises of tables 2a-2i containing data. In the replication method a B-tree or a B+Tree is applied as an index structure in the data tables. A B+Tree is shown in FIG. 2. It keeps data sorted and allows searches, insertions, and deletions in logarithmic amortized time. The piece of data stored in a B-tree is usually called a key. In a unique index, each key is logically unique and can occur in the B-tree in only one location.

Each table 2a-2i has a unique tree index comprising index keys and hierarchical sums of cyclic redundancy check values calculated from the data on each tree index level. A tree index is an ordered set of entries. Each entry contains a search-key value and a pointer to a specific row in the table that contains the value. An index key is a data quantity composed of one or more fields from a data row.

FIG. 2 represents a part of a simple three level B+ tree implementing an index for 48 data rows. The cyclic redundancy check values ($c_{1 \ldots n}$) of each data row are stored with the corresponding index keys ($k_{1 \ldots n}$) in the leaf nodes 24. An internal node 23 contains a number of pointers to leaf nodes. A corresponding index key and a sum of all the cyclic redundancy check values in the corresponding leaf node are stored with each pointer except the last one. The cyclic redundancy check values of the leaf node pointed by the last pointer are included in the cyclic redundancy check sum in the upper internal node which is in this example the root node 22. The sum of all cyclic redundancy check values in the whole index 21 is stored with the pointer to the root node.

A B-tree consists of node structures containing index keys, and pointers that link the nodes of the B-tree together.

The method for replicating databases is based on calculating and storing sums of cyclic redundancy check values on the data to all levels of the B or B+ tree of selected logically unique index in a database table 2a-2i. It is storing structures and providing service to check the consistency of the redundant copies of the database tables 2a-2i and correct the differences in case of found inconsistencies. The cyclic redundancy check value is calculated on each key, i.e. data row in the database table, and stored to the leaf. The cyclic redundancy check values of the keys are added together to the sum of cyclic redundancy check values on the internal node to which the leafs belong to and further the sums of cyclic redundancy check values of the internal nodes are added together to the node they belong to. Finally there is one sum of cyclic redundancy check values that is calculated from all the data in the database table.

By comparing the sum of cyclic redundancy check values of the redundant copies of the database table, it can be verified whether the copies are logically consistent with each others. Logical consistency means that the tables contain valid data. In case the sum of cyclic redundancy check values of the redundant copies differ from each others, the tree index is logically divided into two sub tree indexes, and the sums of the cyclic redundancy check values of the sub tree indexes are compared to each other and so on until the actual difference in the data is found. The inconsistent data is replicated between the databases. If a data exists in several copies of the table, the modification time of the data (row modification time) is used to decide which copy of the data is the newest one. The deleted data rows are detected with deletion log that is kept in each database.

The sum of cyclic redundancy check values comparison process described allows finding the differences of two arbitrary sized tables in O (log n) time. E.g. for two tables with 1 000 000 000 rows it would take 30 iterations to find a difference between the copies. However, as there are often many differences close to each other, using blocks of for example 64 rows instead reduces the iterations down to 24.

In B-trees, internal nodes can have a variable number of child nodes within some predefined range. When data is inserted or removed from a node, its number of child nodes changes. In order to maintain the predefined range, internal nodes may be joined or split. Because a range of child nodes is permitted, B-trees do not need rebalancing as frequently as other self-balancing search trees, but may waste some space, since nodes are not entirely full. The lower and upper bounds on the number of child nodes are typically fixed for a particular implementation. For example, in a 2-3 B-tree, each internal node may have only 2 or 3 child nodes.

B-trees have substantial advantages over alternative implementations when node access times far exceed access times within nodes. This usually occurs when most nodes are in secondary storage such as hard drives. By maximizing the number of child nodes within each internal node, the height of the tree decreases, balancing occurs less often, and efficiency increases. Usually this value is set such that each node takes up a full disk block or an analogous size in secondary storage. While 2-3 B-trees might be useful in main memory, and are certainly easier to explain, if the node sizes are tuned to the size of a disk block, the result might be a 257-513 B-tree.

Every B-tree is of some "order n", meaning nodes contain from n to 2n keys, and nodes are thereby always at least half full of keys. Keys are kept in sorted order within each node. A corresponding list of pointers is effectively interspersed between keys to indicate where to search for a key if it isn't in the current node. A node containing k keys always also contains k+1 pointers.

Each node of a b-tree may have a variable number of keys and children. The keys are stored in non-decreasing order. Each key has an associated child that is the root of a sub-tree containing all nodes with keys less than or equal to the key but greater than the preceding key. A node also has an additional rightmost child that is the root for a sub tree containing all keys greater than any keys in the node.

A b-tree has a minimum number of allowable children for each node known as the minimization factor. If t is this minimization factor, every node must have at least t−1 keys. Under certain circumstances, the root node is allowed to violate this property by having fewer than t−1 keys. Every node may have at most 2t−1 keys or, equivalently, 2t children.

Since each node tends to have a large branching factor (a large number of children), it is typically necessary to traverse relatively few nodes before locating the desired key. If access to each node requires a disk access, then a B-tree will minimize the number of disk accesses required. The minimization factor is usually chosen so that the total size of each node corresponds to a multiple of the block size of the underlying storage device. This choice simplifies and optimizes disk access. Consequently, a b-tree is an ideal data structure for situations where all data cannot reside in primary storage and accesses to secondary storage are comparatively expensive or time consuming.

Figure 3:
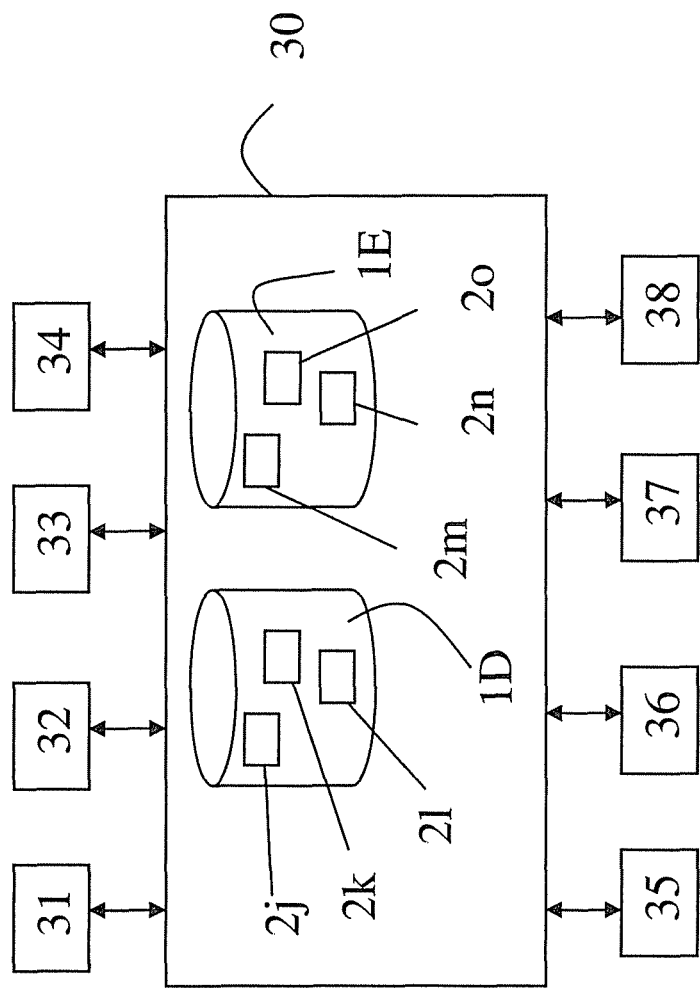
FIG. 3 is a general illustration of a system for a database replication for a process information management system.

FIG. 3 illustrates a database replication system for a process information management system.

Process information system is an example of information management system. Process information management systems (PIMS) 30 interface the various control or other systems to gather process data, with sampling times of a second or less or more. Process information management system provides data exchange between the application programs 31, distributed control systems (DCS) 32, programmable logic controllers (PLC) 33, laboratory information management systems (LIMS) 34, manufacturing execution systems (MES) 35, collaborative production management systems (CPM) 36, computerized maintenance management systems (CMMS) 37, Advanced Process Control applications (APC) 38, and other information technology systems around. Process information management systems provides data processing services, data acquisition and access interfaces, data visualization and analyses tools, calculation and application development tools, and integrates all significant values and information and stores them in large, efficient real time relational database.

Process information management system has usually two or more independent servers providing database services to other computer programs or computers. In this example there are two servers 1D, 1E and both contain independently working, but between each other replicated database, data production and history recording and applications. In this embodiment the databases are stored in different computers.

The real time process information management has the following characteristics, for instance: input data flow from process equipment ranging from 10 to 100000 data rows per second continuously for history recording into the database; continuous data processing, aggregating, and storing of the input data flow to aggregated history values; storage of other relational application data in the same database; 1 second response time with high data access performance to applications and users.

When one of the servers 1D of the process information management system is down for instance due to hardware failure or a disk system upgrade the other server 1E is running. Real time data comprising for instance measurements and/or operating parameters of process devices is supplied then only to the database tables 2j-2l of the running server 1E which are updated. After the recovery of the server 1D and continuously at run time the consistency of the databases in the servers is verified and controlled. The database replication system has an automatic consistency control and recovery. A database is a number of tables, and the consistency control and recovery are based on time stamps and checksums on each row and sums of cyclic redundancy check values in logically unique index. The row with a newer time stamp is assumed to be the correct one, and a missing row is searched on a list of deleted rows.

In case of hardware failure in one of the servers there is no break in the operation of the process information management system. Neither a disk failure causes a break to the information flow. There is the possibility to rebuild the system without interruption after the failure and the system can stand several consecutive failures of the computers without interruptions in operation of the process information management system or loss of data.

The system for replicating databases allows also a disk system upgrade without a break in the process information management system.

The method for replicating databases is advantageously performed using a computer. The programs to be used are stored in the memory of the computer or on computer readable media, which can be loaded on a computing device, for example a DVD. These computer readable media have instructions for enabling the computer to execute a method.

The invention has been described above with the help of certain embodiments. However, the description should not be considered as limiting the scope of patent protection; the embodiments of the invention may vary within the scope of the following claims.

The invention claimed is:

1. A method for replicating databases, in which method at least two databases are replicated, each database having one or more tables, and each table having data and a unique tree index that includes index keys and hierarchical sums of cyclic redundancy check values calculated from the data on each tree index level, the method comprising:
    receiving data from a data source;
    storing, in each database, the received data in a respective table in real time;
    maintaining, as data is stored in the respective tables of each database, logical consistency of the data between corresponding tables in the databases by comparing the sums of cyclic redundancy check values of the database tables continuously at run time;
    if a difference between the sums of the cyclic redundancy check values is found, logically dividing the tree indexes into two sub tree indexes, and comparing the sums of the cyclic redundancy check values of the sub tree indexes to each other;
    continuing the comparison of cyclic redundancy check values and division of tree indexes until inconsistent data causing the difference is found; and
    replicating the inconsistent data between the databases;
    wherein each tree index comprises a plurality of leaf nodes, a plurality of internal nodes, a root node, and a sum of all cyclic redundancy check values, each leaf node comprising cyclic redundancy check values for data stored in the respective tables of the respective database and corresponding index keys, each internal node comprising sums of cyclic redundancy check values for corresponding leaf nodes and corresponding index keys, and each root node comprising sums of cyclic redundancy check values for corresponding internal nodes and corresponding index keys.

2. The method according to claim 1, wherein an index structure in the database is a B–tree or a B+tree having nodes, and the cyclic redundancy check values and the sums of cyclic redundancy check values of a database table are stored in the nodes of the unique tree index of the database table.

3. The method according to claim 1, wherein the databases are stored in different computers.

4. The method according to claim 1, wherein the consistency of the databases is verified and controlled continuously at run time of the data source.

5. A method for replicating databases in an information management system for ensuring consistency of the databases, in which method at least two databases are replicated, each database having one or more tables, each table having real time data and a unique tree index that includes index keys and hierarchical sums of cyclic redundancy check values calculated from the data on each tree index level, the method comprising:
    receiving data from a data source;
    storing, in each database, the received data in a respective table in real time;
    maintaining, as data is stored in the respective tables of each database, logical consistency of the data between corresponding tables in the databases by comparing the sums of cyclic redundancy check values of the database tables continuously at run time;
    if a difference between the sums of the cyclic redundancy check values is found, logically dividing the tree indexes into two sub tree indexes, and comparing the sums of the cyclic redundancy check values of the sub tree indexes to each other;
    continuing the comparison and division until inconsistent data causing the difference is found; and
    replicating the inconsistent data between the databases, and the replicated databases are put to serve the information management system;
    wherein each tree index comprises a plurality of leaf nodes, a plurality of internal nodes, a root node, and a sum of all cyclic redundancy check values, each leaf node comprising cyclic redundancy check values for data stored in the respective tables of the respective database and corresponding index keys, each internal node comprising sums of cyclic redundancy check values for corresponding leaf nodes and corresponding index keys, and each root node comprising sums of cyclic redundancy check values for corresponding internal nodes and corresponding index keys.

6. The method according to claim 5, wherein an index structure in the database is a B–tree or a B+tree having nodes, and the cyclic redundancy check values and the sums of cyclic redundancy check values of a database table are stored in the nodes of the unique tree index of the database table.

7. The method according to claim 5, wherein the databases are stored in different computers.

8. The method according to claim 5, wherein the information management system is a process information management system and real time data comprising measurements and/or operating parameters of process devices is supplied to at least one of the database tables.

9. The method according to claim 5, wherein the consistency of the databases is verified and controlled continuously at run time of the data source.

10. A non-transitory computer-readable medium configured with instructions that when executed by one or more processors cause carrying out a method for replicating databases, in which method at least two databases are replicated, each database having one or more tables, and each table having data and a unique tree index that includes index keys and hierarchical sums of cyclic redundancy check values calculated from the data on each tree index level, the method comprising:
    receiving data from a data source;
    storing data in at least one of the databases in real time;
    maintaining, as data is stored in the respective tables of each database, logical consistency of the data between corresponding tables in the databases by comparing the sums of cyclic redundancy check values of the database tables continuously at run time;
    if a difference between the sums of the cyclic redundancy check values is found, logically dividing the tree indexes into two sub tree indexes, and comparing the sums of the cyclic redundancy check values of the sub tree indexes to each other;
    continuing the comparison and division until inconsistent data causing the difference is found; and
    replicating the inconsistent data between the databases;
    wherein each tree index comprises a plurality of leaf nodes, a plurality of internal nodes, a root node, and a sum of all cyclic redundancy check values, each leaf node comprising cyclic redundancy check values for data stored in the respective tables of the respective database and corresponding index keys, each internal node comprising sums of cyclic redundancy check values for corresponding leaf nodes and corresponding index keys, and each root node comprising sums of cyclic redundancy check values for corresponding internal nodes and corresponding index keys.

11. The non-transitory computer-readable medium of claim 10, wherein the consistency of the databases is verified and controlled continuously at run time of the data source.

12. A system for replicating databases comprising:
at least two independent servers, wherein each server includes a database having one or more tables, and each table having data and a unique tree index including index keys and hierarchical sums of cyclic redundancy check values calculated from the data on each tree index level, each database including:
means for receiving data from a data source;
storing data in at least one of the databases in real time;
means for maintaining, as data is stored in the respective tables of each database, logical consistency of the data between corresponding tables in the databases by comparing the sums of cyclic redundancy check values of the database tables continuously at run time;
means for finding a difference between the sums of the cyclic redundancy check values, means for logically dividing the tree indexes into two sub tree index;
means for comparing the sums of the cyclic redundancy check values of the sub tree indexes to each other;
means for continuing the comparison and division until the data causing the difference is found; and
means for replicating the inconsistent data is between the databases;
wherein each tree index comprises a plurality of leaf nodes, a plurality of internal nodes, a root node, and a sum of all cyclic redundancy check values, each leaf node comprising cyclic redundancy check values for data stored in the respective tables of the respective database and corresponding index keys, each internal node comprising sums of cyclic redundancy check values for corresponding leaf nodes and corresponding index keys, and each root node comprising sums of cyclic redundancy check values for corresponding internal nodes and corresponding index keys.

13. The system according to claim 12, wherein the databases are stored in different computers.

14. The system of claim 12, wherein the means for maintaining logical consistency of the data between corresponding tables in the databases verifies and controls consistency of the databases continuously at run time of the data source.

* * * * *